Sept. 3, 1946.  F. A. FIRESTONE  2,406,946
MUSIC TEACHING DEVICE
Filed Jan. 28, 1944  2 Sheets-Sheet 1

INVENTOR
Floyd A. Firestone.

Sept. 3, 1946.  F. A. FIRESTONE  2,406,946
MUSIC TEACHING DEVICE
Filed Jan. 28, 1944  2 Sheets-Sheet 2

INVENTOR
Floyd A. Firestone

Patented Sept. 3, 1946

2,406,946

UNITED STATES PATENT OFFICE 2,406,946

MUSIC TEACHING DEVICE

Floyd A. Firestone, Ann Arbor, Mich.

Application January 28, 1944, Serial No. 519,997

8 Claims. (Cl. 84—423)

My invention relates to a method of recording the composition of a composer of music, and of playing the composition on a keyboard instrument similar to a modified piano or organ.

An object of my invention is to provide a simplified method for conveying the artistic product of a musical composer to the performer, and from the performer through a keyboard instrument to the finished performance, through providing a simplified notation and simplified keyboard which cooperate with each other in such manner as to minimize the demands on the performer.

A further object is to simplify the art of sight reading music through the provision of a simplified musical notation which reduces the errors in the rendering of the music on a keyboard instrument.

My invention will be understood by reference to the drawings wherein.

When one looks into the interior of a piano he finds a uniformly ordered series of strings, 12 to the octave, tuned at equal intervals apart; he also finds a uniform series of hammers and dampers which cooperate with the strings. The rendition of any piece of music of which the piano is capable consists in the actuation of these hammers and dampers with such velocities and timing as will bring about the execution of the composition of the composer as interpreted by the performer.

When, however, one looks at the conventional methods for converting the composition of the composer into appropriate motions of the hammers and dampers, he finds this accomplished through the use of a complicated and irrational musical notation and a keyboard which complicates the technique of executing the composition. The conventional keyboard consists of seven white keys to the octave with five black keys interspersed in groups of three and two.

Figure 1:
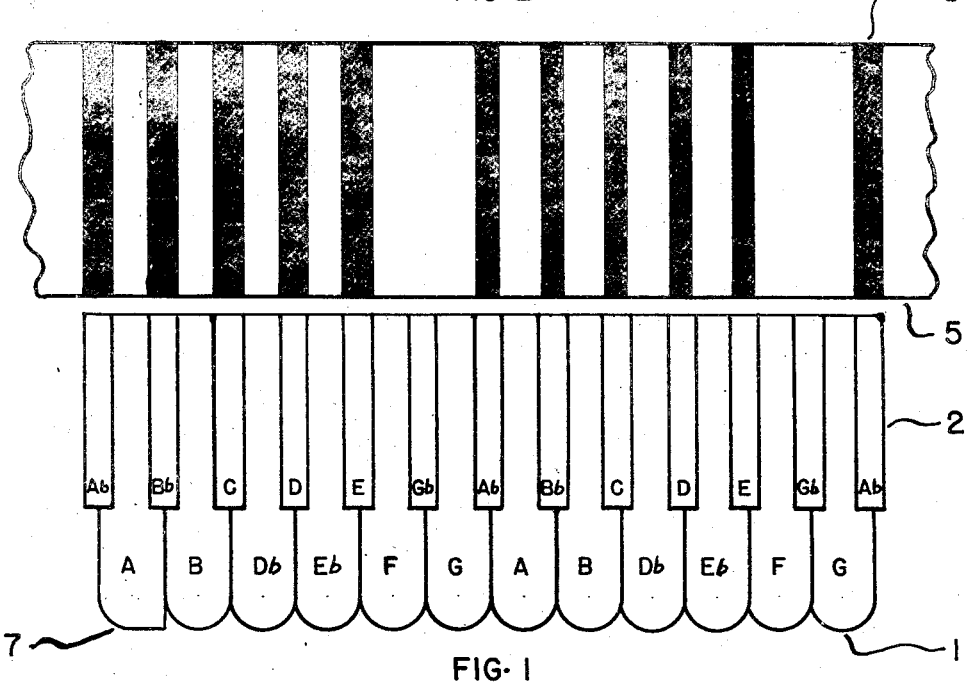
Fig. 1 shows the layout of a simple form of the proposed keyboard.

One form of keyboard which I propose is shown in Fig. 1 consisting of six white keys to the octave, such as 1, and six black keys to the octave, such as 2. There is a black key between each pair of adjoining white keys, the black keys being situated above and to the rear of the principal playing surface of the white keys, as in the conventional keyboard. The white keys actuate the hammers giving the notes of the following conventional pitches as one plays up the scale: A, B, D flat, E flat, F, and G. The black keys actuate the following notes: A flat, B flat, C, D, E, and G flat. Thus the uniform arrangement of the hammers and dampers is retained on the keyboard which actuates them, except insofar as the keys are divided into two uniformly arranged sets, namely, white and black. Since the arrangement of the keys is uniform, it is necessary to provide a method of marking the keys so as to distinguish them; for instance, every G flat key might be painted red. But the method of marking which I prefer is to provide a vertical stiff sheet 5 which lies against the riser just back of the keyboard (on many pianos this riser folds down to form a protecting cover over the keyboard) which sheet is provided with a series of wide black lines 6 having the spacing of the black keys. The line corresponding to G flat is normally omitted, thus leaving groups of five lines one octave apart. If desired, this marking sheet may extend clear up across and above the music rack so that the marking lines may be clearly seen in the margin of the performer's vision even when he is looking at the music. Or the marking might be accomplished by employing translucent keys with lights behind them, said lights controlled by a multiple switch which would be shifted when the music was to be transposed.

This form of keyboard has the following advantages:

(a) All major scales starting on a black keynote have the same fingering and are executed by the same finger motions; to play up several octaves of any major scale starting on a black keynote one plays in succession three black notes, four white, three black, four white, etc. Similarly, all major scales starting on a white keynote have the same fingering and finger motions and to play up several octaves of such a scale one plays in succession three white, four black, three white, four black, etc. The fingering on all scales starting on a black keynote is the same as the fingering on the scales starting on a white keynote, although the finger motions are different for the black scales than for the white scales; thus when one has learned one basic fingering as applied to a black and again to a white scale, he can run all twelve major scales with equal facility. When running scales with both the right and left hands one octave apart, it happens that the thumbs of both hands are used simultaneously, which simplifies the learning. (By contrast, the conventional keyboard, because of its non-uniformity, requires different fingering and technique for each of the twelve major scales and only the most advanced students ever master them all.)

(b) An upward chromatic run is made in the right hand by the simple fingering: thumb, index, middle, ring finger, thumb, etc. This four-fingers-in-succession method is extremely simple to execute. One may learn in one hour chromatic runs in both hands simultaneously. (By contrast, a chromatic run on the conventional keyboard requires a basicly slow fingering of thumb, middle, thumb, middle, thumb, etc., and only the advanced students are ever able to do chromatic runs in both hands.)

(c) To play a given musical interval, say a third as from C to E, two fingers are set at a definite constant distance from each other, in all parts of the scale. A given shaping of the hand results in playing the same chord at any part of the keyboard. (By contrast, on the conventional keyboard, from C to E is a third, four semitones, while from E up to G, an equal distance, is only a minor third, three semitones. To play a chord of the seventh, for instance, requires many different shapings of the hand.)

(d) An interval of a tenth can be played with a normally large hand when based on any note of the scale, and is always played with the same stretch of the hand. (By contrast, on the conventional keyboard, the interval of a tenth cannot be played at many positions; for instance, from E flat up to G cannot be played.)

(e) Since this keyboard has six white keys to the octave while the conventional keyboard has seven white keys to the octave, if the octave spacing is kept equal for both, each white key on my keyboard will be 16% wider than the conventional width, resulting in a considerable decrease in the accuracy with which a finger must be positioned in order to avoid making an error by striking two notes at once.

(f) By sliding the thumb along the white keys and simultaneously sliding the first finger along the black keys, a chromatic glissando may be easily executed i. e., notes a semitone apart may be played in rapid succession.

(g) Since any composition may be played any number of whole tones higher or lower with exactly the same fingering and technique, transposition may be effected merely by moving the sheet 5 right or left by a distance corresponding to any whole number of notes.

(h) This keyboard cooperates with the system of simplified musical notation explained below.

Figure 2:
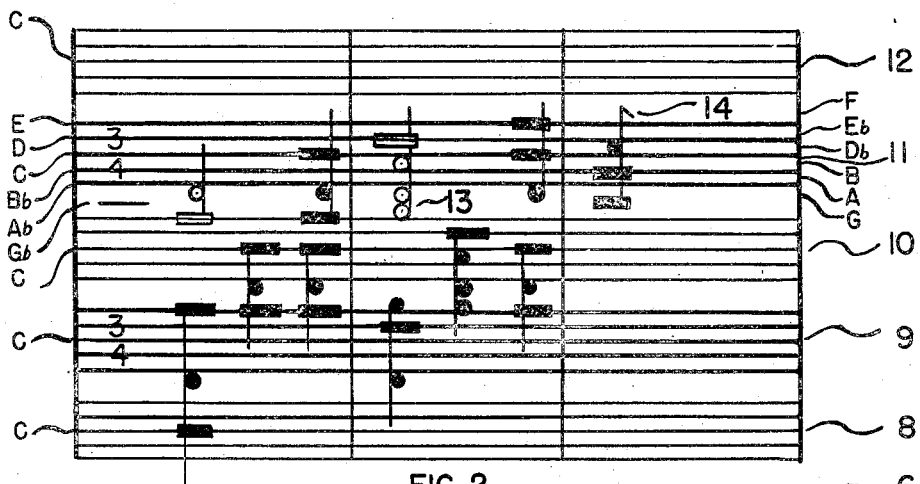
Fig. 2 shows the method of writing the music for same.

I propose a system of musical notation as shown in Fig. 2 for the recording of the composer's composition when using a keyboard as shown in Fig. 1. The brace consists of five staffs 8, 9, 10, 11, and 12 each consisting of five lines. The spacing between the staffs is the same as the spacing between alternate lines of one staff; the same as if one line had been omitted from the space. Each staff and its adjacent spaces records the notes of one octave as shown by the letters at the edges of Fig. 2; the lines of the staff represent the black notes of the keyboard, A flat, B flat, C, D, E, and G flat on the missing line between staffs; the spaces of the staff represent the white notes of the keyboard, G, A, B, D flat, E flat, and F, as shown. All staffs record the notes in the same manner, the central line of each staff being the note C; the five staffs therefore record the notes of five octaves, the horizontal line through the middle of staff 10 being middle C. Staffs 11 and 9 cover the general ranges covered by the conventional treble and bass staffs, and may be printed somewhat heavier as shown. If notes are to be written above or below the staffs provided, additional staffs or portions thereof may be added according to the same system, or the 8va symbol may be used in the conventional manner.

The notes are written on these staffs in approximately conventional manner except that each note written on a line is preferably of rectangular form in order not only to aid the eye in localizing the note but also to indicate how the hand is to be shaped in playing a chord inasmuch as the rectangular form indicates black keys which must be reached for at the back of the keyboard, while the round notes indicate white keys. The space between staffs is used for writing the two round white notes F and G as shown at 13, and the rectangular black note G flat as shown at the bottom of chord 14. The notes of a chord to be played by the right hand are tied together by a stem projecting upward on the right side of the notes; chords to be played by the left hand are tied together by a stem projecting downward on the left side of the notes. Time is indicated in the conventional manner except that the flag indicating a sixteenth note etc. should preferably turn outward away from the notes, as shown at 14, so as not to be confused as a note. Words of a song may be written above or below the brace; or the brace may be separated in the center in the conventional manner and the words written therein; in this case the staff 10 may be associated with the bass in order to accommodate left hand notes up to that pitch, and may be duplicated and associated with the treble in order to accommodate right hand notes going down to that pitch. No key signatures, sharps, flats, or naturals are written into the music since there is a place on the brace for every note of the keyboard. The first two measures of Fig. 2 are a variation of the Merry Widow Waltz.

The marking lines 6 on the sheet 5 of Fig. 1 are an enlarged copy of the brace of staffs, the groups of lines 6 and 15 corresponding to staffs 11 and 9 preferably being wider lines than the lines 16 corresponding to staff 10, etc.

This method of recording the composition has the following advantages:

(a) The spacing between two notes accurately indicates the spacing at which the fingers are to be set in order to play the notes on my keyboard. A given chord, say an inverted chord of the seventh as 12, will have exactly the same appearance and spacings when based on any white key in the scale; when based on a black key the spacings will be the same but round and rectangular notes will be interchanged. The shaping of the hand in order to play a chord is completely indicated by the spacing between the notes and the distinction between round notes played on white keys and rectangular notes played on black keys. (By contrast, the conventional musical notation does not indicate the spacing of the fingers except in the most crude manner even when no sharps or flats are used; the addition of sharps and flats further widens the disparity between apparent interval between notes and finger spacing required to play them. There is no relationship between chord appearance and shape of hand required to play it.)

(b) Since every note has an assigned position on the staff, it is not necessary to use any sharps or flats in key signatures or accidentals of any kind. This eliminates a major source of errors of execution of conventional music, namely, failure to take account of the modifying action of the sharps or flats in the key signature, or the modifying action of accidentals occurring earlier in the measure. In my notation, in cooperation with my keyboard, music in four to six sharps or flats is as easy to read and execute as music written in the key of C. Much conventional music is not available to any except the advanced student since it is written in four to six flats and is thus difficult both to read and to play.

(c) Since the brace of Fig. 2 cooperates with the sheet 5 of Fig. 1 to indicate directly the note which is to be played, the beginner learns rapidly.

Figures 3, 3A:
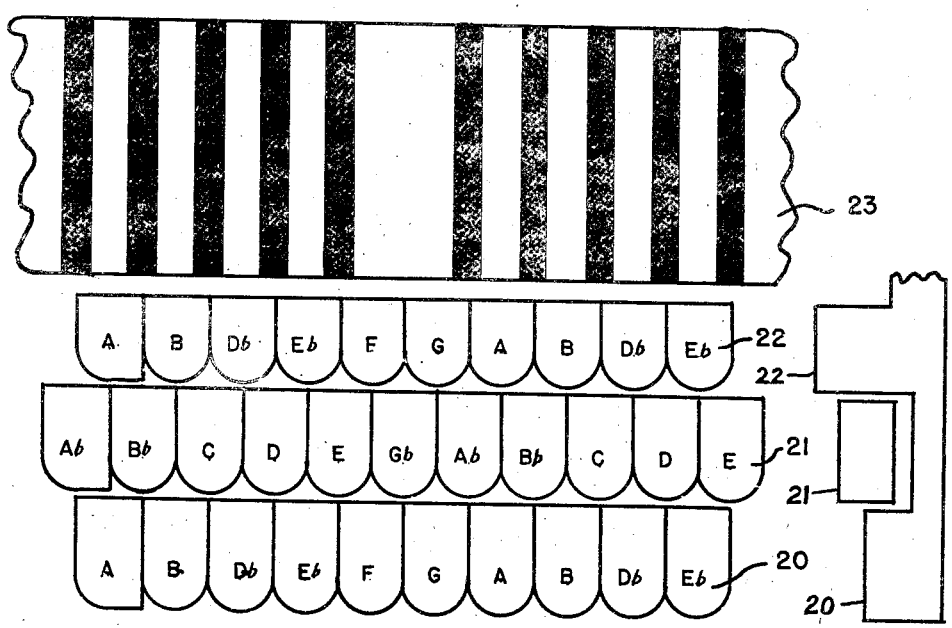
Fig. 3 shows the layout of a more improved form of keyboard.
Fig. 3A shows a side view of the keyboard of Fig. 3.

Another form of keyboard for carrying out my invention is shown in Fig. 3 and utilizes keys of form somewhat similar to those shown by D. Barnett in Patent 1,958,227. (Since I provide a whole tone scale having six white keys and six black keys per octave while Barnett utilizes a conventional scale of seven white keys per octave in addition to seven black keys, my keys are about 16% wider, my keyboard yields a constant relationship between hand shape and chord produced, chromatic runs are easier, and transposition is easier.) The front white keys 20 are situated at the front of the keyboard in the usual manner, but six keys per octave. The black keys 21 of approximately the same length as the white keys lie above and just to the rear of the white keys. On this keyboard the white keys do not have playing surfaces between the black keys; the black keys are approximately as wide as the white keys. Above and to the rear of the black keys is a third row of keys 22 which we may designate as the "rear white" keys since they are functionally connected with the "front white" keys situated at the front of the keyboard. There are six upper white keys per octave. Thus any white note such as G, A, B, D flat, E flat, or F may be played either at the front white key or the corresponding rear white key.

It was mentioned in connection with the description of the keyboard of Fig. 1 that to play up a major scale starting on a white key requires the successive playing of three white keys, four black keys, three white, four black, etc. To play four black in succession requires the use of the thumb on at least one black key, which is awkward. With the keyboard of Fig. 3, the three white notes are played on the rear white keyboard, the four black are then played on the black keyboard which, having wide keys will accommodate the thumb as easily as the front white keys would. The preferred fingering of the major scale of G is as follows: rear white G, 2nd finger (index finger); rear white A, 3rd finger; rear white B, 4th finger; black C, thumb; black D, 2nd finger; black E, 3rd finger; black F sharp (G flat), thumb; rear white G, 2nd finger; etc. All major scales starting on a white key, namely the scales of G, A, B, D flat, E flat, and F, finger exactly as the scale of G just given, all finger motions being the same in all particulars. All major scales starting on a black key, namely C, D, E, G flat, A flat, and B flat, finger exactly alike, as for example, the key of C: black C, 2nd finger (index finger); black D, 3rd finger; black E, 4th finger; front white F, thumb; front white G, 2nd finger; front white A, 3rd finger; front white B, thumb; black C, 2nd finger; etc. It is thus seen that whether the major scale starts on a white key or a black key, in other words no matter where it starts, the fingering and the finger motions are exactly the same. (Contrast this with the different finger motions required for each of the 12 scales on either the conventional keyboard, or the Barnett modification thereof. It is not sufficient for fingerings to be the same in all scales, as Barnett claims; finger motions must be the same or each of the 12 scales requires special practice; finger motions are different for the 12 scales, even on Barnett's keyboard.)

The keyboard of Fig. 3 possesses all of the advantages mentioned above in connection with the keyboard of Fig. 1, plus the following advantages:

(a) Whereas on the keyboard of Fig. 1, major scales starting on white and black keys have the same fingering but different finger motions, on the keyboard of Fig. 3 they have the same fingering and the same finger motions. While with the conventional keyboard the student must learn the finger motions for 12 types of scales, and on Fig. 1 must learn finger motions for 2 types of scales, on Fig. 3 he must learn finger motions for one type of scale only.

(b) The black keys being wide, are as easy to play as white keys.

(c) Hand shape determines the chord produced, exactly, whether based on white or black.

(d) A chromatic glissando can be played merely by dragging two fingers simultaneously along the white and black keyboards.

The movable marking sheet 23 of Fig. 3 is provided on the riser and has similar structure and function to marking sheet 5 of Fig. 1.

Figure 4:
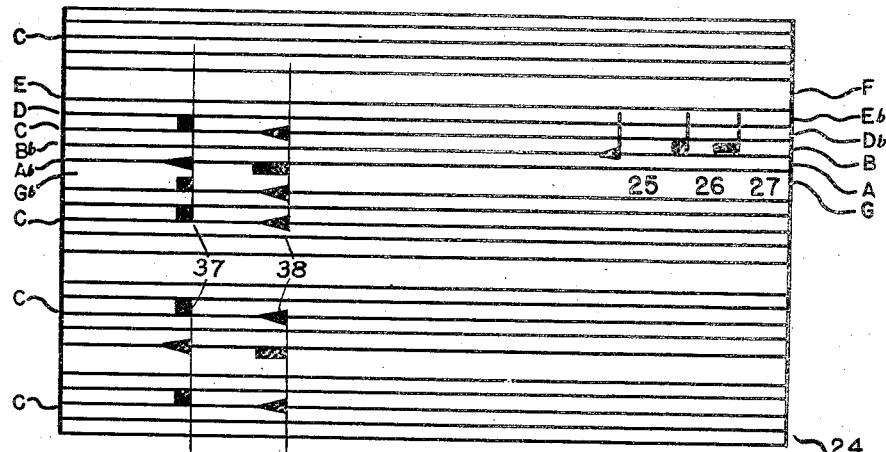
Fig. 4 shows the method of writing the music for same.

The brace of staffs for the musical notation for use with the keyboard of Fig. 3 is shown in Fig. 4. Since there are three levels of keys in Fig. 3, there are preferably three shapes of notes used to designate them. Thus black keys may be indicated by triangles 25 on the lines of the staffs; front white keys are indicated by circles 26 in the spaces between the lines; rear white keys are indicated by rectangles 27 between the lines. Notes 26 and 27 indicate the same pitch to be played but also indicate that the most convenient hand position for playing 26 is the front position, and for playing 27 is the rear position. Usually, if a chord contains any rectangular note, the rearward position of the hand is indicated; if it contains any circular note, the forward position is indicated (near the front edge of the keyboard). Obviously, the particular symbols (circle, rectangle, triangle, etc.) used to designate the different positions of the notes fore and aft, may be interchanged if desired; or other symbols may be used, it being one of the points of my invention that different symbols may be used to represent the different levels of keys, whether there be two, three, or four levels. For instance, if square, triangle, and rectangle be used to designate front white keys, black keys, and rear white keys, respectively, then the chord do—mi—sol—do in the right hand with do—sol—do in the left hand would be written as shown at 37 of Fig. 4 if do fell on a white key, and would be written as shown at 38 if do fell on a black key.

The advantages of this notation of Fig. 4 in combination with the keyboard of Fig. 3 are as mentioned above with reference to Fig. 2.

Many variations of my invention may be made without departing from its spirit. Obvious extensions of this basic notation may be made to record the music to be played on a several manual organ having keyboards of my type. The central line of the staff might be assigned to be any other note than C. The number of lines in the staff might be other than five, with corresponding adjustment in the width of the spaces between staffs. The keyboards of Figs. 1 or 3 might be constructed by means of adapters which screw on over a conventional keyboard, or are mounted in a frame held above the conventional keyboard, or might be constructed de novo. Or the keyboard might be constructed at four levels, levels one and three being white keys operably connected, while levels two and four are black keys operably connected; this structure permits transposition by one semitone while retaining exactly the same finger motions throughout the composition.

It should be noted that the musical interval of one octave represents a frequency ratio of two to one; the octave is a misnomer in the sense that a conventional keyboard has only seven white keys per octave, not eight. A note and its octave should not both be counted as lying within the octave. As used throughout the claims, the phrase "duplex whole tone keyboard" shall refer to a keyboard sounding 12 notes per octave, the keys being arranged in two or more levels, the keys in any level being equally spaced and sounding the tones of a whole tone scale (six equal musical intervals per octave), the keys of alternate levels being functionally connected, while the keys of adjacent levels sound the tones of two whole tone scales one semi-tone removed from each other.

I claim:

1. A device for teaching the playing of a musical instrument having a duplex whole tone keyboard of two or more levels, comprising: a staff consisting of groups of five equi-spaced lines, the space between adjacent groups being equal to the space between alternate lines of a group as if a line had been omitted; notes, which written on the lines indicate keys of one of the whole tone scales and written in the spaces indicate keys of the other whole tone scale, notes on the successive lines and spaces of the staff indicating successive keys of the two whole tone scales; with the result that the lateral spacing of the fingers in playing a chord is graphically exactly indicated by the spacing of the notes which indicate the chord.

2. A device for teaching the playing of a musical instrument having a duplex whole tone keyboard of two or more levels, comprising: a staff consisting of groups of five equi-spaced lines, the space between adjacent groups being equal to the space between alternate lines of a group as if a line had been omitted; notes, which written on the lines indicate keys of one of the whole tone scales and written in the spaces indicate keys of the other whole tone scale, notes on the successive lines and spaces of the staff indicating successive keys of the two whole tone scales, notes indicating keys on each different level of the keyboard having different and distinctive dimensions in a direction parallel to the lines of the staff; with the result that the lateral spacing of the fingers in playing a chord is graphically exactly indicated by the spacing normal to the staff lines of the notes which indicate the chord, and the forward extension of the fingers is indicated by the note dimension parallel to the lines of the staff.

3. A device for teaching the playing of a musical instrument having a duplex whole tone keyboard of two or more levels, comprising: a staff consisting of groups of five equi-spaced lines, the space between adjacent groups being equal to the space between alternate lines of a group as if a line had been omitted; notes, which written on the lines indicate keys of one of the whole tone scales and written in the spaces indicate keys of the other whole tone scale, notes on successive lines and spaces of the staff indicating successive keys of the two whole tone scales, the notes of any chord which are to be played simultaneously with one hand being conjoined by a stem consisting of a line essentially at right angles to the lines of the staff, notes indicating keys on each different level of the keyboard having their tip end which is farthest from the stem extending to different and distinctive distances from the stem; with the result that the lateral spacing of the fingers in playing a chord is graphically exactly indicated by the spacing normal to the staff lines of the notes which indicate the chord, and the forward extension of the fingers in playing the chord is graphically indicated by the locus of the tips of the notes of the chord.

4. A teaching device as in claim 3 except that the notes indicating keys on each different level of the keyboard are of different and distictive shape and have their tip end which is farthest from the stem, extending to different and distinctive distances from the stem; with the result that the lateral spacing of the fingers in playing a chord is graphically exactly indicated by the spacing normal to the staff lines of the notes which indicate the chord, and the forward extension of the fingers in playing the chord is graphically indicated by the locus of the tip ends of the notes which are farthest from the stem, the quick perception of this tip end position being aided by the distinctive note shape.

5. A device for teaching the playing of a musical instrument having a duplex whole tone keyboard of three levels or ranks, comprising: a staff consisting of groups of five equi-spaced lines, the space between adjacent groups being equal to the space between alternate lines of a group as if a line had been omitted; notes which written on the lines indicate keys of one of the whole tone scales and written in the spaces indicate keys of the other whole tone scale, notes on successive lines and spaces of the staff indicating successive keys of the two whole tone scales, the notes of a chord which are to be played simultaneously with one hand being conjoined by a stem consisting of a line essentially at right angles to the lines of the staff, notes indicating keys on the ranks nearest, intermediate, and farthest, from the performer being of square, triangular, and rectangular shape respectively, the tip ends farthest from the stem of each shape of note being at increasing distance from the stem in the order, square, triangle, and rectangle; with the result that the lateral spacing of the fingers in playing a chord is graphically exactly indicated by the spacing normal to the staff lines of the notes which indicate the chord, and the forward extension of the fingers in playing the chord is graphically indicated by the locus of the tip ends of the notes which are farthest from the stem, the quick perception of this tip end position being aided by the distinctive note shape.

6. A teaching device as described in claim 1 but including a key identifying means on or near the keys, which is an approximate copy of the staff on which the notes are written.

7. A teaching device as described in claim 3 but including a key identifying means on or near the keys, which is an approximate copy of the staff on which the notes are written.

8. A teaching device as described in claim 5 but including a key identifying means on or near the keys, which is an approximate copy of the staff on which the notes are written.

FLOYD A. FIRESTONE.